(No Model.) 2 Sheets—Sheet 1.

A. SWINGLE.
OATMEAL MACHINE.

No. 307,882. Patented Nov. 11, 1884.

Witnesses,
Geo. H. Strong.
J. A. Rouse.

Inventor,
A. Swingle
By Dewey & Co.
Attorneys (No Model.) 2 Sheets—Sheet 2.

A. SWINGLE.
OATMEAL MACHINE.

No. 307,882. Patented Nov. 11, 1884.

Witnesses,
Geo. H. Strong.
J. H. Strong

Inventor,
A. Swingle
By Dewey & Co.
Attorneys

UNITED STATES PATENT OFFICE.

ALFRED SWINGLE, OF SAN FRANCISCO, CALIFORNIA.

OATMEAL-MACHINE.

SPECIFICATION forming part of Letters Patent No. 307,882, dated November 11, 1884.

Application filed May 27, 1884. (No model.)

*To all whom it may concern:*

Be it known that I, ALFRED SWINGLE, of the city of San Francisco, in the county of San Francisco and State of California, have invented Improvements in Oatmeal-Machines; and I hereby declare the following to be a full, clear, and exact description thereof.

My invention relates to a machine for cutting oats or other grain, or for similar purposes. The machine comprises a cylinder revolving on a hollow horizontal shaft, through which the grain is fed into the cylinder, a series of knives or cutters arranged at intervals around the circumference of the cylinder at a short distance therefrom, with a casing or shield extending from one knife or cutter to the other, and having openings through which the cut material may be discharged. The circumference of the cylinder is perforated with holes of sufficient size to allow the oats or other grain to fall into them endwise and be carried around with their ends in contact with the surrounding casing until they arrive at the edges of the knives, when the projecting portions will be cut off and discharged. This action continues until the oats are all cut up. Below the cylinder is a spiral conveyer, which delivers the cut material into the inclined cylinder, where the flour and the first and second sizes of the grain may be separated. At the exterior of the cylinder is a smaller cylinder having projecting pins, which are so placed as to enter the holes in the periphery in the main cylinder as it revolves, and thus press out any particles of oats which may become fixed in the holes.

Figure 1:
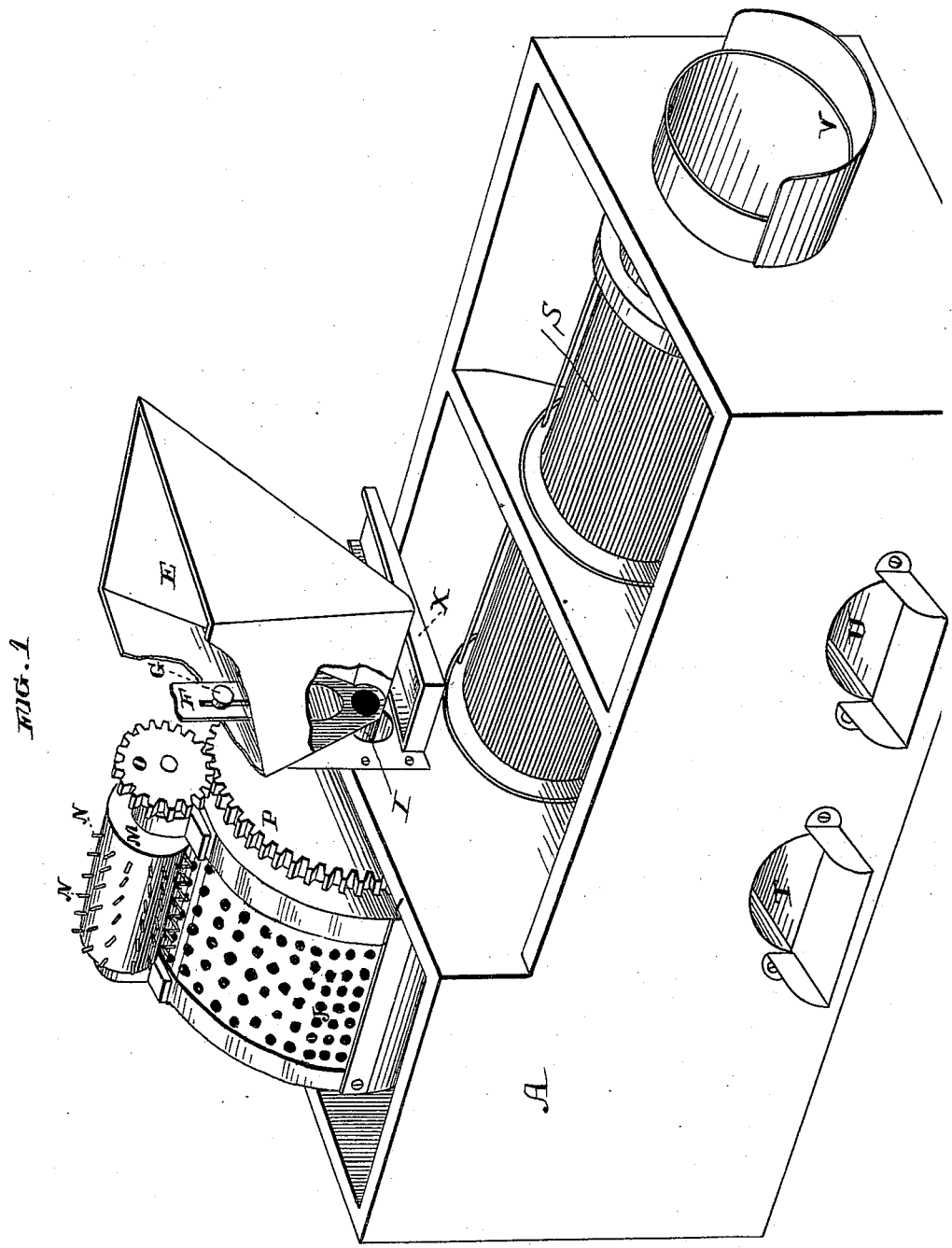
Figures 2, 3:
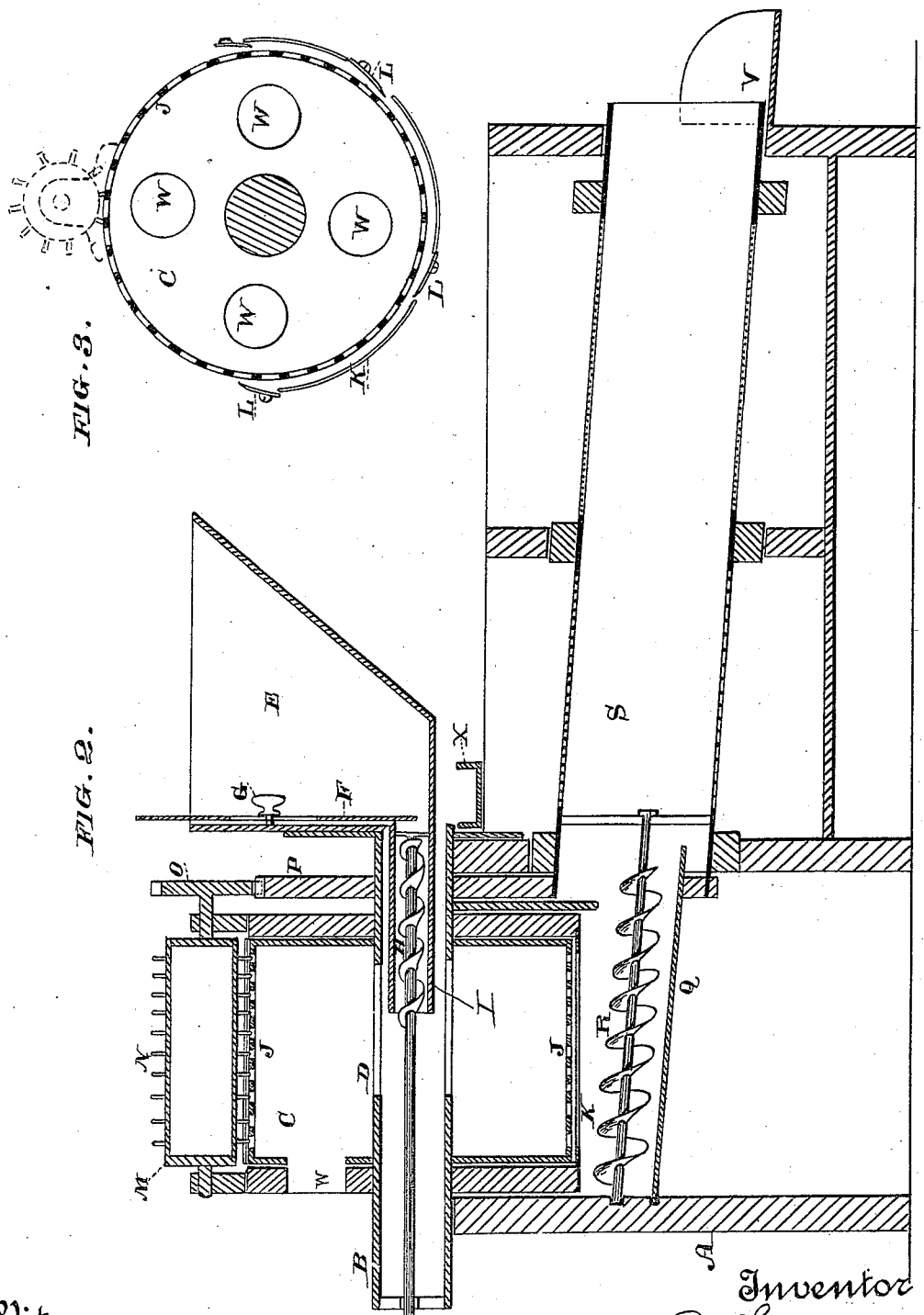

Referring to the accompanying drawings for a more complete explanation of my invention, Figure 1 is a perspective view of my apparatus, showing a portion of the feed-hopper and a portion of the exterior casing of the cylinder broken away. Fig. 2 is a vertical section. Fig. 3 is a transverse section of the cylinder and casing.

My apparatus is mounted upon a suitable inclosed casing or frame-work, A.

B is a hollow shaft or arbor of suitable diameter, having a cylinder, C, fixed to it, and openings D are made in this hollow shaft, through which material from the interior of the shaft may pass into the cylinder.

E is the hopper into which the oats, grain, or other material to be cut up is placed, and F is a sliding gate, with an adjusting thumb-screw, G, or other suitable device by which the amount of opening at the bottom may be regulated.

H is a spiral screw conveyer turning upon the shaft within a tube, I, which leads from the bottom of the hopper E into the interior of the hollow shaft B, discharging the grain, so that it may pass from the hollow shaft into the cylinder C, as before described. Around the periphery of this cylinder are made holes J, of sufficient size to allow the oats or other grain which are to be cut up to enter endwise and pass through them, if no obstruction be offered.

In order to hold the oats in the proper position to be cut, a casing, K, surrounds the lower part of the cylinder at a short distance therefrom, so that when the grains stand with their ends through the openings in the periphery of the cylinder their opposite outer ends will rest upon the casing, and as the cylinder revolves will be carried around with their ends in contact with the casing until they reach the cutting-knives L, which are arranged outside of the cylinder, and with their edges projecting through the exterior of the casing K, so that as the grain arrives at the point where one of these knives is situated it will be carried across the edge of the knife by the revolution of the cylinder, and thus a small portion will be cut off and the remainder may drop through, so that its end again rests on the casing K, and when it reaches the next knife it will be again cut, and so on, with all the grain which falls into these holes.

In order to prevent the holes from becoming clogged with grain which will neither fall out nor advance, another cylinder, M, is mounted above the cylinder C, and it has pins or projections N around its periphery, so arranged that they may enter the holes J in the periphery of the cylinder C. As these pins enter all the holes of the cylinder successively when the cylinder is revolved, it will be seen that they press in any oats which may become fixed in the holes and leave them free to receive other grains when they arrive at the lower part of the rotation of the cylinder, where these grains may fall into the holes.

In order to cause the cylinders C and M to rotate together, so that the pins N will always pass into the holes J, they are provided with gears O and P upon their shafts, and these gears mesh so as to cause the cylinders to rotate in unison. When the grain has been cut, it passes through the throats, formed between the edges of the knives and the casing, and falls into the chute Q, within which is a screw-conveyer, R, by which it is carried out and delivered into the interior of the revolving cylinder S. The exterior of this cylinder is formed of material the first portion of which will admit any very fine particles or flour which have been formed in the process of cutting to pass through, and these may be discharged through the chute or hopper at T. The second section of the cylinder is of such fineness as to allow the second grade of material to pass through and be discharged at the chute U, while the final larger particles, which are to be used for the oatmeal or other broken grain, will pass out at the end of the cylinder at V. In one end of the cylinder C are made a series of openings, W, having mica or other transparent substance through which the contents of the cylinder may be observed from time to time, and one or more of these openings may have its cover made removable, so that the interior of the cylinder may be reached, or for other purposes.

X is a trough or chute placed just beneath the end of the hollow shaft, so that any grain which may pass out beneath the tube H will be caught by this chute and conveyed away.

Having thus described my invention, what I claim as new, and desire to secure by Letters Patent, is—

1. An apparatus for cutting oats and similar material, comprising a horizontal cylinder having its periphery perforated, in which the oats may stand endwise, an exterior casing to limit the distance through which the oats may pass through the cylinder, a series of cutting-knives the edges of which extend through slots in the exterior casing, a hollow perforated arbor upon which the cylinder is mounted, and a screw-conveyer for discharging the oats or other material into this hollow arbor, and thence into the interior of the cylinder, as herein described.

2. In an oatmeal-cutting machine, a horizontal cylinder, casing, cutting-knives, and a hollow shaft or arbor, in combination with the hopper E, provided with a tube extending into the arbor, adjustable regulating-gate F, and feed-conveyer H, as herein described.

3. An oatmeal-machine comprising the horizontal rotating cylinder having the perforated periphery, exterior casing, and cutting-knives, the receiving spout or chute below, a discharge-conveyer, and the rotating cylinder S, having its periphery formed with openings for the purpose of sizing the product and grading it, as herein described.

4. An oatmeal-cutting machine comprising the horizontal cylinder, exterior casing, and cutting-knives, the hollow perforated shaft or arbor, and interior tube extending into this shaft, the conveyer or screw by which material is carried from the hopper into the shaft, and the exterior spout X, situated beneath the open end of the hollow arbor, to receive grain which may be discharged beneath the tube H, as herein described.

In witness whereof I have hereunto set my hand.

ALFRED SWINGLE.

Witnesses:
S. H. NOURSE,
H. C. LEE.